United States Patent Office 3,035,099
Patented May 15, 1962

3,035,099
PREPARATION OF TETRACHLORO-ALKYLPHENOLS
Eric Royle Lynch, Rhos-y-Waen, Chirk, Denbighshire, and Ernest Bryson McCall, Llangollen, Denbighshire, Wales, assignors to Monsanto Chemicals Limited, London, England, a British company
No Drawing. Filed May 5, 1958, Ser. No. 732,823
4 Claims. (Cl. 260—623)

This invention relates to the preparation of tetrachloro-m-alkylphenols, and especially tetrachloro-m-cresol (2:4:5:6-tetrachloro-3-methylphenol).

When m-cresol is chlorinated under conditions suitable for nuclear chlorination, chlorine atoms are introduced progressively until the ortho- and para-positions are all substituted and 2:4:6-trichloro-m-cresol is obtained. The only position remaining unsubstituted, that is the 5-position, which is meta- to both the methyl and hydroxyl groups, is difficult to chlorinate by existing methods. Although the tetra-chloro compound can be obtained, yield and quality of product are poor and the drastic chlorination conditions required tend to result in polymeric and over-chlorinated products.

Tetrachloro-m-cresol is valuable as a bactericide and a satisfactory method for making it commercially would be very useful.

It has now been found that if the last stage of the chlorination of m-cresol, that is the introduction of the fourth chlorine atom in the nucleus, is carried out in a suitable solvent at a temperature not less than 40° C. in the presence of a chlorination catalyst there is obtained an excellent yield of the desired tetrachloro derivative.

The present invention is a process for the preparation of a tetrachloro-m-alkylphenol in which the last chlorine atom is introduced by a chlorination step carried out at 40° C. or above in the presence of a chlorination catalyst and an organic solvent substantially inert under the chlorination conditions.

A variety of tetrachloro-m-alkylphenols can be prepared by the process of the invention, but it is particularly effective for making tetrachloro-m-cresol. However, in general the alkyl group can contain more than one carbon atom; the group can for instance be a lower alkyl group such as methyl, ethyl, propyl or butyl. The starting material in the chlorination can be either a chloro-m-alkylphenol containing three or less chlorine atoms or alternatively a m-alkylphenol, in other words the process of the invention need not be reserved solely for the introduction of the last chlorine atom; thus tetrachloro-m-cresol for instance can be prepared from either trichloro-m-cresol or m-cresol. Since however m-cresol is easily chlorinated to trichloro-m-cresol this stage need not be carried out by means of the process of the invention; for instance the trichloro compound can be obtained conveniently by chlorinating m-cresol in the absence of a solvent or a catalyst.

It is also possible to conduct the chlorination process of the invention such that over-chlorination occurs, that is to say so that the product contains a tetrachloro-m-alkylphenol and some chlorocyclohexadienone material formed by additive chlorination to one of the double bonds of the benzene ring. It is sometimes convenient to permit this to occur so as to ensure that complete nuclear chlorination has taken place; the course of the chlorination and the extent of the over-chlorination can be followed by periodic weighing of the reaction mass so that the quantity of chlorine reacted can be determined. For instance when starting with 2:4:6-trichloro-m-cresol the chlorination can be allowed to proceed until some of the tetrachloro-m-cresol has been converted to 2:4:4:5:6-pentachloro-3-methylcyclohexa-2:5-dienone. The overchlorinated material can be treated, either in the presence of the main bulk of the tetrachloro-m-alkylphenol or after it has been separated as a by-product in the isolation of the tetrachloro-m-alkylphenol, so as to convert it back to give additional tetrachloro-m-alkylphenol. This can be done by treatment with a reducing agent, or alternatively by heating with a suitable quantity of the corresponding trichloro-m-alkylphenol. The treatment using a reducing agent can for example be carried out by means of an aqueous solution of sodium hydrosulphite, sodium metabisulphite or sodium sulphite. Where the conversion is effected using a trichloro-m-alkylphenol this is preferably done by heating together the components in the presence of a Friedel-Crafts catalyst, such as for instance aluminium chloride.

In the chlorination process an organic solvent that is substantially inert to chlorine at the reaction temperature in the presence of the chlorination catalyst is employed. It is convenient in practice to use a suitable chloroalkane, and particularly a higher member of the series having a boiling point at atmospheric pressure of more than 100° C., for instance tetrachloroethylene, 1:1:1:2-tetrachloroethane or, particularly, symmetrical tetrachloroethane.

A suitable chlorination catalyst is a Friedel-Crafts catalyst, for example a metal halide such as for instance aluminium chloride.

The chlorination temperature is as stated above not lower than 40° C., and the preferred temperatures are between 65° and 75° C. Excellent results are obtained using a temperature of about 70° C.

The quantity of solvent present during the chlorination is not critical, but it is obviously desirable not to use an unnecessarily large amount; good results are obtained using for instance a weight of solvent which is 1½ times the weight of the material to be chlorinated.

The invention is illustrated by the following examples.

*Example 1*

This example describes the production of tetrachloro-m-cresol by chlorination of 2:4:6-trichloro-m-cresol at 40° C. and various other higher temperatures.

25 grams of 2:4:6-trichloro-m-cresol were dissolved in 25 cc. of tetrachloroethylene at 35° C. in a 100 cc. three-necked flask fitted with a stirrer, a chlorine inlet tube, a thermometer, and a reflux condenser carrying a calcium chloride tube at the top. The temperature of the contents of the flask could be controlled by means of a water bath surrounding the flask. 0.5 gram of powdered aluminium chloride were then added, the temperature was raised to 40° C., and a slow stream of chlorine was passed through the flask contents until the theoretical amount had been adsorbed.

At the end of this period the reaction mixture was cooled to 10° C., and the solid product which formed was filtered off and washed with 15 cc. of petroleum ether (boiling point 60°–80° C.). The product was air dried to give 9.5 grams of pale yellow needles having a melting point of 175°–185° C. After recrystallisation from the same solvent the melting point was 189°–189.5° C. (the melting point of tetrachloro-m-cresol is 190° C.).

This experiment was repeated using the higher temperatures shown in the table below. The results demonstrate the improvement in yield obtained by the use of a temperature of for instance 65°–70° C.

| Run | Temperature, °C | Yield of crystalline product | | M.P. °C | Chlorination time, minutes |
|---|---|---|---|---|---|
| | | Grams | Percent | | |
| 1 | 40 | 10.0 | 34 | 177–182 | 240 |
| 2 | 60–65 | 18.5 | 63 | 175–182 | 60 |
| 3 | 65–70 | 20.0 | 68 | 174–183 | 70 |
| 4 | 80–85 | 18.8 | 64 | 178–182 | 60 |

*Example 2*

This example describes the use of symmetrical tetrachloroethane as solvent in the production of tetrachloro-m-cresol.

In an apparatus similar to that used in Example 1 100 grams of 2:4:6-trichloro-m-cresol, 100 cc. of symmetrical tetrachloroethane and 2 grams of powdered aluminum chloride were heated to 65°–70° C., and subjected to a stream of chlorine for 75 minutes. During this period the system increased in weight by 15.5 grams.

The reaction mixture was then cooled to 10° C. and the precipitated product was filtered off, washed with petroleum ether (boiling point 40°–60° C.) and dried.

The yield was 77 grams, a yield of 66% of theory, of crystals having a melting point of 186°–188° C.

*Example 3*

This example describes the production of tetrachloro-m-cresol using the technique in which some 2:4:6-trichloro-m-cresol is over-chlorinated so that 2:4:4:5:6-pentachloro-3-methylcyclo-hexa-2:5-dienone is formed and this is then reduced to give a further quantity of the required tetrachloro-m-cresol.

In the type of apparatus described in Example 1 chlorine was passed into a mixture of 300 grams of 2:4:6-trichloro-m-cresol, 300 cc. of symmetrical tetrachloroethane and 6 grams of powdered aluminium chloride at 65° C. After two hours the system had increased in weight by 63 grams.

100 cc. of cold water were then added and the solvent was removed by steam distillation, the residue being 352 grams of an oil which solidified on cooling. The composition of this intermediate product was approximately 72% of tetrachloro-m-cresol and 27% of 2:4:4:5:6-pentachloro-3-methylcyclohexa-2:5-dienone.

This intermediate product was powdered, added to an aqueous solution containing 117 grams of sodium hydrosulphite in 1.17 litres of water and 70 cc. of 0.880 ammonium hydroxide, and the mixture was refluxed with stirring for one hour. It was then cooled, and the solid material was filtered off, washed with water and dried to give 319 grams of tetrachloro-m-cresol (melting point 177–184° C.).

*Example 4*

This example describes the production of tetrachloro-m-cresol from 2:4:4:5:6-pentachloro-3-methylcyclohexa-2:5-dienone obtained from previous experiments in which over-chlorination had occurred.

1.4 grams of 2:4:4:5:6-pentachloro-3-methylcyclohexa-2:5-dienone which had been recovered as a by-product from an over-chlorination of the type described in Example 3 was mixed with 1.06 grams of trichloro-m-cresol and the mixture was heated to melt it. 0.1 gram of powdered aluminium chloride was then added and the heating continued on a steam bath for 10 minutes. The solid product was allowed to cool, was dissolved in ethanol and this solution was added to water. The precipitated solid was filtered off, washed with water and dried to give 2.2 grams of tetrachloro-m-cresol (melting point 175–187° C.).

What we claim is:

1. The method of preparing 2,3,4,6-tetrachloro-m-alkylphenol, which comprises contacting 2,4,6-trichloro-m-alkylphenol wherein the alkyl group has up to four carbon atoms with gaseous chlorine while suspended in a chlorine inert liquid chloroalkane in the presence of a Friedel-Crafts metal halide catalyst until a substantial portion of 2,4,4,5,6-pentachloro-m-alkylcyclohexa-2,5-dienone is formed, and then heating the reaction mixture with an added portion of 2,4,6-trichloro-m-alkylphenol stoichiometrically equivalent to the 2,4,4,5,6-pentachloro-m-alkylcyclohexa-2,5-dienone in the said mixture to form a high yield of the 2,3,4,6-tetrachloro-m-alkylphenol.

2. The method of preparing 2,3,4,6-tetrachloro-m-alkylphenol, which comprises heating 2,4,4,5,6-pentachloro-3-alkylcyclohexa-2,5-dienone wherein the alkyl group has up to four carbon atoms with 2,4,6-trichloro-m-alkylphenol, wherein the alkyl radical is identical to that in the 2,4,4,5,6-pentachloro-m-alkylcyclohexa-2,5-dienone, in a proportion stoichiometrically equivalent to the said 2,4,4,5,6-pentachloro-3-alkylcyclohexa-2,5-dienone.

3. The method of preparing 2,3,4,6-tetrachlorocresol, which comprises contacting 2,4,6-trichlorocresol with gaseous chlorine while suspended in the chlorine inert chlorinated ethane in the presence of aluminium chloride until a substantial portion of 2,4,4,5,6-pentachloro-3-methylcyclohexa-2,5-dienone is formed, and then heating the reaction mixture with an added portion of 2,4,6-trichlorocresol stoichiometrically equivalent to the 2,4,4,5,6-pentachloro-3-methylcyclohexa-2,5-dienone.

4. The method of preparing 2,3,4,6-tetrachlorocresol, which comprises heating 2,4,4,5,6-pentachloro-3-methylcyclohexa-2,5-dienone with 2,4,6-trichlorocresol in a proportion stoichiometrically equivalent to the said 2,4,4,5,6-pentachloro-3-methylcyclohexa-2,5-dienone.

References Cited in the file of this patent

UNITED STATES PATENTS

| 2,131,259 | Stoesser | Sept. 27, 1938 |
| 2,176,417 | Britton et al. | Oct. 17, 1939 |
| 2,662,918 | Spaulding | Dec. 15, 1953 |